(12) United States Patent
French et al.

(10) Patent No.: US 8,850,578 B2
(45) Date of Patent: Sep. 30, 2014

(54) NETWORK INTRUSION DETECTION

(75) Inventors: Paul French, Cork (IE); Boris Ilijev, Cork (IE)

(73) Assignee: International Business Machines Corporation, Armonk, NY (US)

(*) Notice: Subject to any disclaimer, the term of this patent is extended or adjusted under 35 U.S.C. 154(b) by 972 days.

(21) Appl. No.: 12/186,774

(22) Filed: Aug. 6, 2008

(65) Prior Publication Data

US 2010/0037318 A1 Feb. 11, 2010

(51) Int. Cl.
*G06F 21/00* (2013.01)
*H04L 12/24* (2006.01)
*H04L 12/26* (2006.01)

(52) U.S. Cl.
CPC .............. *H04L 43/00* (2013.01); *H04L 43/16* (2013.01); *H04L 12/2602* (2013.01); *H04L 41/0893* (2013.01)
USPC .......... 726/23; 726/1; 726/3; 726/22; 726/25; 726/26; 713/153; 370/253; 370/254; 370/259

(58) Field of Classification Search
USPC .................. 726/23, 1, 3, 22, 25, 26; 713/153; 370/253, 254, 259
See application file for complete search history.

(56) References Cited

U.S. PATENT DOCUMENTS

| | | | |
|---|---|---|---|
| 7,359,969 B2* | 4/2008 | Motoyama et al. | 709/224 |
| 7,734,777 B2* | 6/2010 | Raja et al. | 709/224 |
| 7,773,510 B2* | 8/2010 | Back et al. | 370/230 |
| 7,782,793 B2* | 8/2010 | Olesinski et al. | 370/253 |
| 7,827,190 B2* | 11/2010 | Pandya | 707/758 |
| 7,920,572 B2* | 4/2011 | Bates et al. | 370/395.2 |
| 2006/0136570 A1* | 6/2006 | Pandya | 709/217 |
| 2007/0159979 A1 | 7/2007 | Butler et al. | |
| 2008/0253314 A1* | 10/2008 | Stephenson et al. | 370/326 |

FOREIGN PATENT DOCUMENTS

WO 2006111970 A1 10/2006

OTHER PUBLICATIONS

Ayo Deledamol , A Peer to peer networking in Ethernet broadband access networks, Master of Science Thesis Stockholm, Sweden 2005, pp. 1-85.*
"Characterizing and detecting relayed traffic: A case study using Skype", Kyoungwon Suh, Daniel R. Figueiredo, Jim Kurose, Don Towsley, "Department of Computer Science" , "University of Massachusetts Amherst, MA 01003", Jul. 11, 2005, pp. 16.*
Andrea Buonerba, Skype Traffic Detection and Characterization, Helsinki University of Technology Department of Electrical and Communications Engineering Networking Laboratory, Sep. 4, 2007, pp. 1-80.*
Andrea Bouonerba, Skype Traffic Detection and Characterization, "Department of Computer Science" , "Helsinki University of Technology Department of Electrical and Communications Engineering Networking Laboratory", Helsinki, Sep. 4, 2007 pp. 1-80.*

(Continued)

*Primary Examiner* — Mohammad A Siddiqi
(74) *Attorney, Agent, or Firm* — Cantor Colburn LLP; Parashos Kalaitzis (57) ABSTRACT

A method of detecting network communications includes monitoring network devices for communication data; generating an output file including the communication data correlated with a communication type; computing network metrics based on the correlated data; comparing the network metrics with a policy threshold; and determining a network violation event based on the comparing.

18 Claims, 5 Drawing Sheets

(56) References Cited

OTHER PUBLICATIONS

Haiyong Xie, Yang richard Yang; "A Measurement-Based Study of the Skype Peer-to-Peer VoIP Performance", Computer Science Department, Yale University; (http://www-net.cs.yale.edu/publications/XY07.pdf) 2007.

Sven Ehlert, Sandrine Petgang; "Analysis and Signature of Skype VoIP Session Traffic"; Fraunhofer FOKUS Technical Report NGNI-SKYPE-06b; Jul. 25, 2006. (http://www1.cs.columbia.edu/~salman/skype/Ehlert_SkypeSignature_2006.pdf).

Saikat Guha, Neil Daswani, Ravi Jain; "An Experimental Study of the Skype Peer-to-Peer VoIP System"; Cornell University; Goolge; (http://www.iptps.org/papers-2006/Guha-skype06.pdf) 2006.

Li Jun, Zhang Shunyi, Xuan Ye, Sun Yanfei; Identifying Skype Traffic by Random Forest; Wireless Communications, Networking and Mobile Computing, 2007. WiCom 2007. International Conference on Volume, Issue , Sep. 21-25, 2007 pp. 2841-2844.

Jane Dudman, Gaynor Backhouse; "Voice over IP: what it is, why people want it, and where it is going"; (http://www.jisc.ac.uk/media/documents/techwatch/tsw0604001.pdf) Article published by JISC Technology and Standards Watch, Sep. 2006.

NEOHAPSIS—Peace of Mind Through Integrity and Insight; (http://archives.neohapsis.com/archives/fulldisclosure/2005-01/0625.html) 2005.

* cited by examiner

| Origin Domain | PT | Port No. | SN? | Dest Domain | CT | Flows | S20 flows | S2S flows | Memory | Session | CPU Usage | Logins | Relays | Packets |
|---|---|---|---|---|---|---|---|---|---|---|---|---|---|---|
| 172.168.19.1 | UPD | 13224 | N | 158.10.10.1 | iSAC | 58 | 0 | 58 | 10 | 38 | 18 | 1 | 3 | 365 |
| 172.168.19.8 | UPD | 10280 | Y | 0 | 0 | 0 | 0 | 0 | 0 | 0 | 0 | 0 | 0 | 0 |
| 172.168.19.10 | TCP | 7300 | N | 114.15.18.2 | 0 | 0 | 0 | 0 | 0 | 0 | 0 | 0 | 0 | 0 |
| 172.168.19.13 | TCP | 38020 | N | 155.1.1.2 | 0 | 0 | 0 | 0 | 0 | 0 | 0 | 0 | 0 | 0 |

NETWORK INTRUSION DETECTION

BACKGROUND

This disclosure relates to detecting intrusion from a communication application on a computer system.

Peer-to-peer (P2P) applications, such as, for example, Skye (Skype is registered trademark of Skype Limited in the US and other countries) allow users to make telephone calls over the Internet, free of charge. Although these peer-to-peer applications are primarily Voice Over IP (VoIP) applications, they also integrate other services such as Instant Messaging (IM), file sharing, video sharing, etc.

Often, in order to provide the services free of charge, the applications take advantage of existing infrastructure to facilitate the communication. For example, the Skype services do not use any infrastructure of their own, rather Skype uses the existing infrastructure of users' computers and internet service providers (ISPs) for call setup and call transmission. This use of the existing infrastructure is performed without notification. For these applications, the use of the existing infrastructure cannot be regulated by the user. Without regulation, the use of the user's infrastructure can result in revenue loss and bandwidth loss for the users and the ISPs.

In another example, as part of its proprietary behavior, Skype makes use of the processing power of network hosts (e.g., university computers) by promoting their use as Skype super nodes by routing numerous calls through the network host. The use of these network hosts can further result in unwanted loss of available processing power (CPU and memory) for the network hosts.

SUMMARY

The shortcomings of the prior art are overcome and additional advantages are provided through the provision of a method of detecting network communications. In one embodiment the method includes monitoring network devices for communication data; generating an output file including the communication data correlated with a communication type; computing network metrics based on the correlated data; comparing the network metrics with a policy threshold; and determining a network violation event based on the comparing.

BRIEF DESCRIPTION OF THE SEVERAL VIEWS OF THE DRAWINGS

The drawings described herein are for illustration purposes only and are not intended to limit the scope of the present disclosure in any way. It should be understood that throughout the drawings, corresponding reference numerals indicate like or corresponding parts and features.

DETAILED DESCRIPTION

Figure 1:
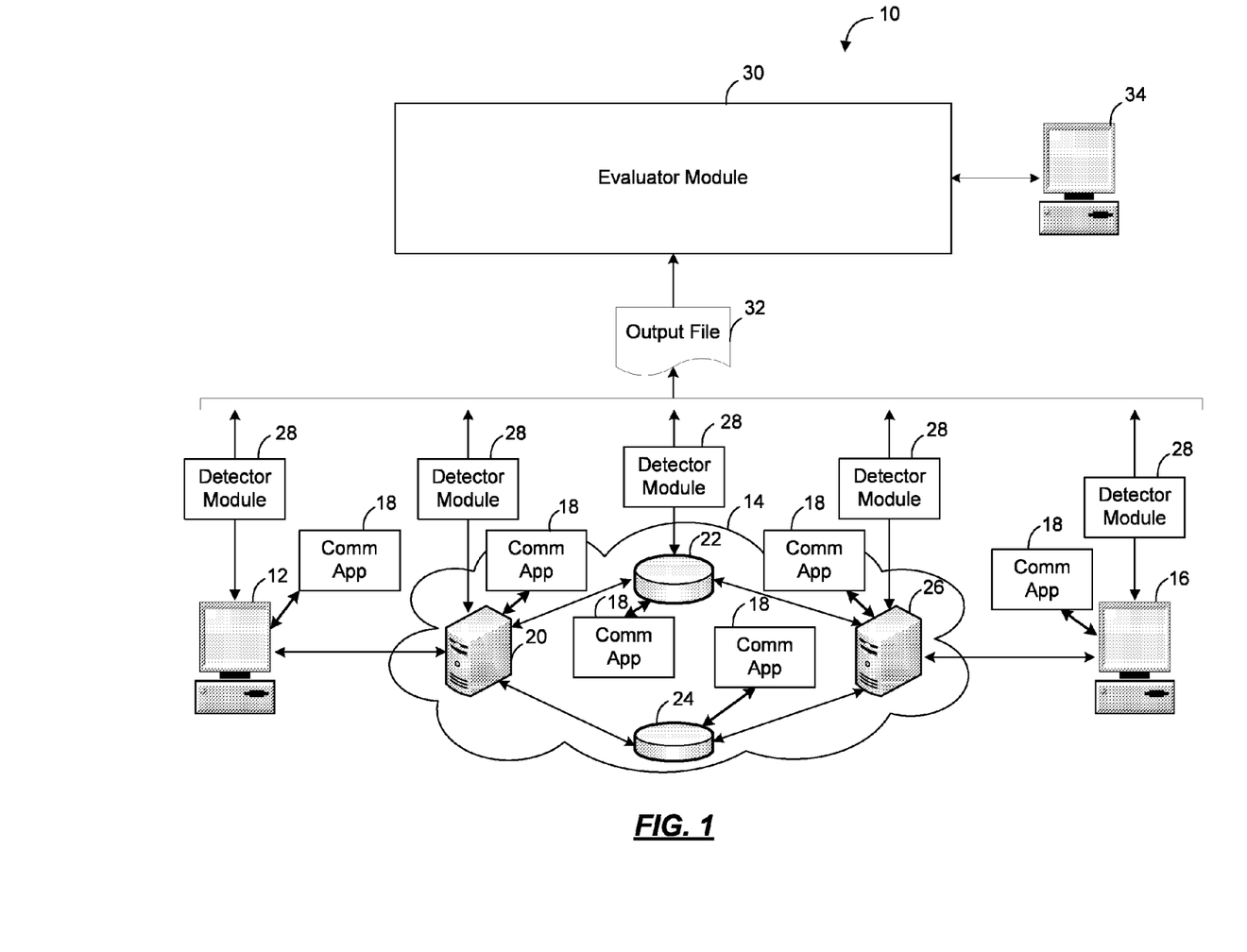
FIG. 1 is a block diagram illustrating a network traffic detection system in accordance with an exemplary embodiment.

Turning now to the drawings in greater detail, it will be seen that in FIG. 1 a network traffic detection system 10 is shown in accordance with an exemplary embodiment. The network traffic detection system 10 includes a first computing system 12 that communicates through a network 14 to a second computing system 16. As can be appreciated, the computing systems of the present disclosure can be any computing system that includes memory and a processor including, but not limited to, a computer, a laptop, a workstation, a server, and a hand-held device.

The first computing system 12 and the second computing system 16 communicate via a communication application 18, for example, a Skype application. The communication application 18 is stored in the memory and executed by the processor of the first computing system 12 and the second computing system 16. The communication can be, but is not limited to, a voice over IP (VoIP) communication, a video communication, an instant messaging communication, a file sharing communication, and/or any other communication.

The network 14 can include one or more network devices 20-26 such as, servers, routers, switches, and\or any other computing systems that similarly run the communication application 18. Each communication application 18 facilitates the communication by making use of the processing power of the hosting device.

In order to detect and evaluate network traffic initiated by the communication application 18, the network traffic detection system 10 includes one or more detector modules 28 and an evaluator module 30. The detector modules 28 reside on one or more of the first computing system 12, the second computing system 16, and/or the network devices 20-26. As will be discussed in more detail below, the detector module 28 employs one or more detection mechanisms to detect traffic initiated by the communication application 28. The detector module 28 then correlates the data output from the various detection mechanisms and generates an output file 32 including the correlated data output.

The evaluator module 30 can reside on a third computing system 34 and receives as input the output file 32. As can be appreciated, the evaluator module 30 can reside on any one of the first computing system 12, the second computing system 16, and the network devices 20-26. For ease of the discussion, the evaluator module 30 is discussed in the context of residing on the third computing system 34. As will be discussed in more detail below, the evaluator module 30 processes the correlated data output of the output file 32, compares the processed data with predefined thresholds, and performs one or more actions based on predefined communication policies.

Figure 2:
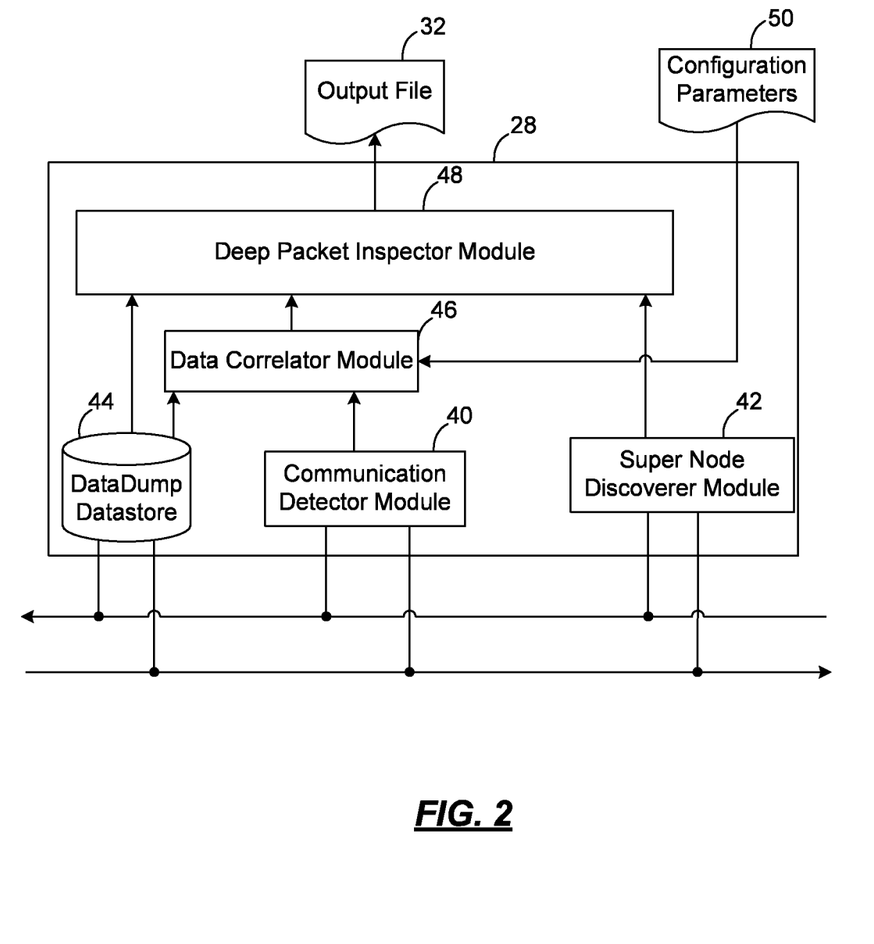
FIG. 2 is a block diagram illustrating a detector module of the network traffic detection system of FIG. 1 in accordance with an exemplary embodiment.

Turning now to FIG. 2, the detector module 28 is shown in more detail in accordance with an exemplary embodiment. The detector module 28 includes one or more sub-modules and datastores. As can be appreciated, the sub-modules can be implemented as software, hardware, firmware and/or other suitable components that provide the described functionality. As can be appreciated, the sub-modules shown in FIG. 2 can be combined and/or further partitioned to similarly detect network traffic. In this example, the detector module 28 includes a communication detector module 40, a super node discoverer module 42, a datadump datastore 44, a data correlator module 46, and a deep packet inspector module 48.

Generally speaking, the detector module 28 monitors network traffic that is received and transmitted by the computing systems 12, 16 (FIG. 1) and/or network devices 20-26 (FIG. 1).

The datadump datastore 44 collects and stores network data relating to the network communications. For example, the datadump datastore 44 stores all TCP or UDP communications made through the hosting device. The communication detector module 40 monitors the network traffic to determine the communication type (e.g., VoIP, video, instant message, etc.). In one example, the communication detector module 40 is an Inter-Packet Gap Recorder (IPGR) that measures the time between packet arrivals to determine if the type of communication is VoIP. As can be appreciated, the detector module 28 can include a plurality of communication detector modules 40 that are operable to detect any number of the various communications types.

The super node discoverer module 42 monitors the network traffic to detect super nodes on the network 14 (FIG. 1). Super nodes are selected by the communication application 18 (FIG. 1) to relay numerous communications due to high bandwidth capacity, a powerful processor, and/or low security measures. In one example, the super node discoverer module 42 generates a listing of super nodes in various domains by IP address of the super node.

The data correlator module 46 receives as input the data from the datadump datastore 44 and the communications type from the communication detector module 40. The data correlator module 46 correlates the communication type with the stored data based on configuration parameters 50. In one example, the configuration parameters 50 indicate that the data shall be correlated by network resources where the network resources include at least one of an originating domain, a destination domain, a port number, and a super node.

The deep packet inspector module 48 receives as input the correlated data from the data correlator module 46, the data from the datadump datastore 44, and the super node listing from the super node discoverer module 42. The deep packet inspector module 48 processes the incoming data and generates the output file 32 that includes related data in a standardized format. In one example, the output file 32 includes protocol information, packet information, flow information, login information, session information, and super node information.

Figure 3:
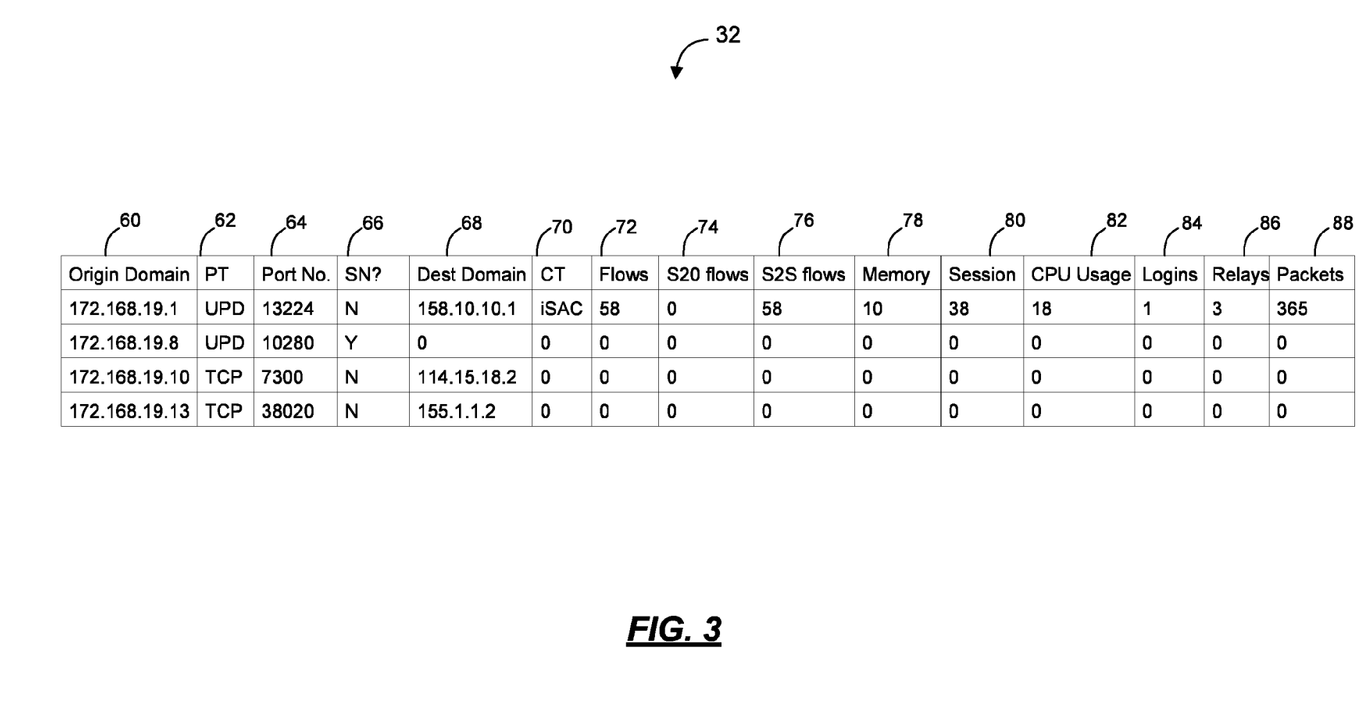
FIG. 3 is a table illustrating an exemplary output file that is generated by the detector module of FIG. 2 in accordance with an exemplary embodiment.

As shown in FIG. 3, an exemplary output file 32 includes data in a table format where each row of the table includes a set of statistics relating to communications across different devices. The set of statistics can include, but are not limited to, an originating domain address 60, a protocol type (PT) 62, a port number 64, a super node indicator 66, a destination domain 68, a codec type (CT) 70, a total number of flows 72, a number of in-network to out-of-network flows (S2O) 76, a number of in-network to in-network flows (S2S) 76, a memory usage 78, a total session time 80, a CPU usage 82, a number of login attempts 84, a number of relays used by the communication 86, and a number of packets 88 transmitted by the communication application 18 (FIG. 1).

Figure 4:
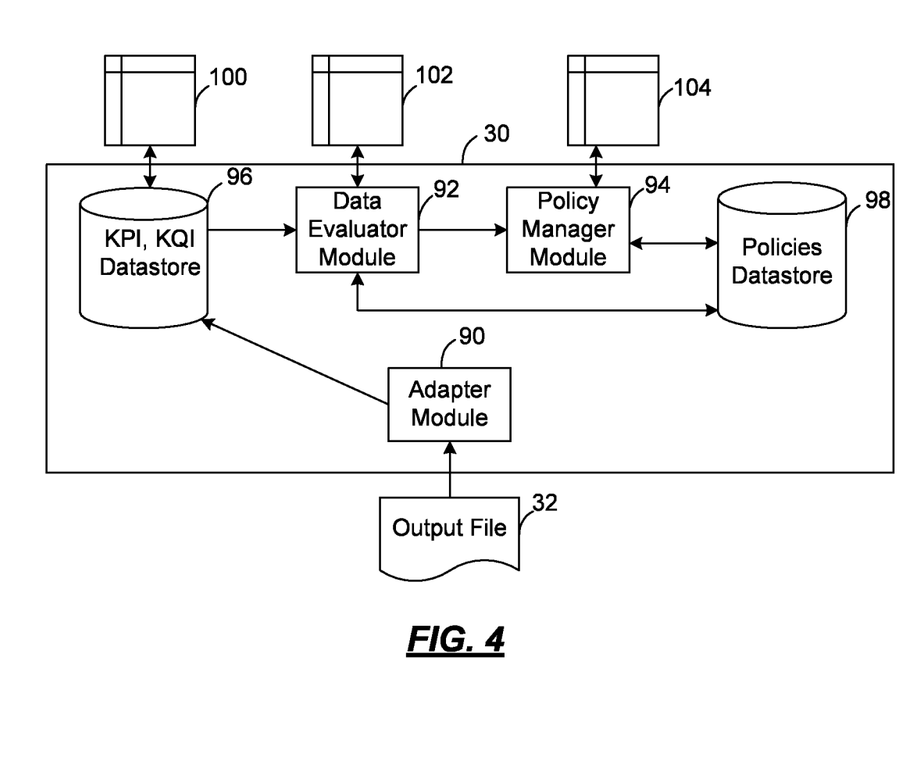
FIG. 4 is a block diagram illustrating an evaluator module of the network traffic detection system of FIG. 1 in accordance with an exemplary embodiment.

Turning now to FIG. 4, the evaluator module 30 is shown in more detail in accordance with an exemplary embodiment. The evaluator module 30 includes one or more sub-modules and datastores. As can be appreciated, the sub-modules can be implemented as software, hardware, firmware and/or other suitable components that provide the described functionality. As can be appreciated, the sub-modules shown in FIG. 4 can be combined and/or further partitioned to similarly evaluate the output file 32. In this example, the evaluator module 30 includes an adapter module 90, a data evaluator module 92, a policy manager module 94, a KPI/KQI datastore 96, and an action policies datastore 98. In various embodiments, the evaluator module 30 generates one or more user interfaces 100-104 that communicate data to and from a user.

The adapter module 90 receives as input the output file 32. The adapter module 90 processes the data of the output file 32 and computes one or more data metrics referred to as KPIs and KQIs. The KPIs and the KQIs measure the utilization of the communication application 18 (FIG. 1) in relation to bandwidth, CPU and memory, a number of current users, and a number of super nodes on the network 14 (FIG. 1).

In one example, the KPIs are data objects representing metrics, including but not limited to:
1. a total number of packets,
2. a total number of packets relating to the communication application,
3. a total number of incoming flows,
4. a number of outgoing flows,
5. a total number of login attempts,
6. a total number of successful logins,
7. a total number of flows over a TCP port,
8. a total session time,
9. a total CPU utilization, and
10. a total memory utilization, as they relate to a single resource, including, but not limited to:
1. a super node,
2. a port number,
3. an originating IP address,
4. a destination IP address,
5. a protocol type,
6. a codec instance,
7. a codec type,
8. a flow instance,
9. an S2O instance, and
10. an S2S instance.

The KQIs are data objects representing either an aggregate of KPIs (e.g., a group of port numbers representing a device such as a switch or a router) or an algorithm that can be performed on two or more KPIs. In one example, the KQIs are data objects representing metrics, including but not limited to:
1. a total number of packets,
2. a total number of packets relating to the communication application,
3. a total number of incoming flows,
4. a number of outgoing flows,
5. a total number of login attempts,
6. a total number of successful logins,
7. a total number of flows over a TCP port,
8. a total session time,
9. a total CPU utilization, and
10. a total memory utilization, as they relate to a group of resources, including, but not limited to:
1. a group of super nodes,
2. a group of port numbers,
3. a group of originating IP addresses,
4. a group of destination IP addresses,
5. a group of protocol types,
6. a group of codec instances,
7. a group of codec types,
8. a group of flow instances,
9. a group of S2O instances, and
10. a group of S2S instances.

In another example, the KQIs are data objects representing functions that can be performed on the KQIs and the KPIs, the functions including, but not limited to:

1. a proportion of total packets relating to the communication application,
2. a proportion of incoming to outgoing flows,
3. a login success rate, and
4. a proportion of TCP flows.

As can be appreciated, there can be any number of KPIs and KQIs. The adapter module 90 stores the KPIs and the KQIs in the KPI/KQI datastore 96. The data values of the KPIs and KQIs stored in the KPI/KQI datastore can optionally be viewed by a user via a data viewer user interface 100.

The data evaluator module 92 receives as input the KPIs and the KQIs from the KPI/KQI datastore 96. The data evaluator module 92 compares the values provided by the KPIs and the KQIs with communication policy thresholds. The communication policy thresholds define when a violation of a communication policy takes place. In various embodiments, a communication policy can be defined by a network condition, a violation event, and an action. The network condition can be defined by the communication policy threshold. (e.g. if KPI value is greater than X threshold) The policies datastore 98 stores the defined communication policies. In one example, the communication policies and the communication policy thresholds are configured by a user via a configuration management interface 104. When the communication policy thresholds are exceeded, the data evaluator module 92 generates a threshold violation event. The data evaluator module 92 optionally provides a reporting of the data as compared with the policies via a conformance reporter user interface 102.

The policy manager module 94 receives as input the violation events and communication policies from the policy manager datastore 98. Based on the policies the policy manager module 94 performs some appropriate action to alleviate the violation. This action can be capable of increasing the capability of the network traffic or decreasing the capability of the network traffic. The policy manager module 94 configures the communication polices and the correlation parameters via user input entered into the configuration manager interface 104.

Figure 5:
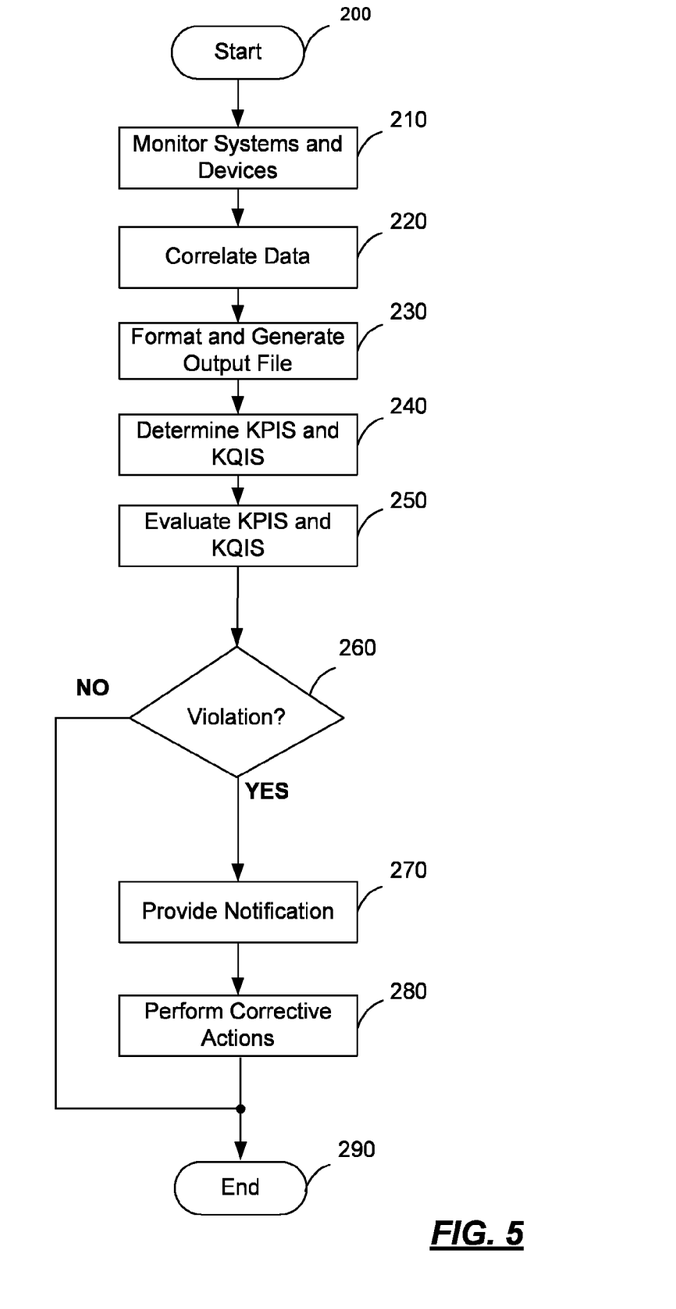
FIG. 5 is a flowchart illustrating a network traffic detection method that can be performed by the network traffic detection system of FIG. 1 in accordance with an exemplary embodiment.

Turning now to FIG. 5, a flow chart illustrates a network traffic detection method that can be performed by the network traffic detection system 10 of FIG. 1 in accordance with an exemplary embodiment. As can be appreciated in light of the disclosure, the order of operation within the method is not limited to the sequential execution as illustrated in FIG. 5, but may be performed in one or more varying orders as applicable and in accordance with the present disclosure.

In one example, the method may begin at 200. The network devices and/or the computing systems are monitored for communication data at block 210. The communication data is then correlated across multiple network devices at block 220 and an output file including the correlated data is formatted and generated at block 230. The output file is then processed at block 240 to formulate the KPIs and KQIs. Each KPI and KQI is evaluated against the predefined policies at block 250. If the KPIs or the KQIs indicate a violation by exceeding a predefined policy threshold at block 260, a notification of the violation is provided at block 270 and corrective actions are performed at block 280. As can be appreciated, the corrective actions can be predefined and/or provided in response to the notification of the violation. Thereafter, the method may end at block 290.

As one example, one or more aspects of the present disclosure can be included in an article of manufacture (e.g., one or more computer program products) having, for instance, computer usable media. The media has embodied therein, for instance, computer readable program code means for providing and facilitating the capabilities of the present disclosure. The article of manufacture can be included as a part of a computer system or provided separately.

Additionally, at least one program storage device readable by a machine, tangibly embodying at least one program of instructions executable by the machine to perform the capabilities of the present disclosure can be provided.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this disclosure, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While a preferred embodiment has been described, it will be understood that those skilled in the art, both now and in the future, may make various improvements and enhancements which fall within the scope of the claims which follow. These claims should be construed to maintain the proper protection for the disclosure first described.

The terminology used herein is for the purpose of describing particular embodiments only and is not intended to be limiting of the invention. As used herein, the singular forms "a", "an" and "the" are intended to include the plural forms as well, unless the context clearly indicates otherwise. The corresponding structures, features, materials, acts, and equivalents of all means or step plus function elements in the claims below are intended to include any structure, material, or act for performing the function in combination with other claimed elements as specifically claimed. The disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of detecting network communications of a network, the method comprising:
    monitoring network devices for communication data, the network devices running a communication application, the communication application configured for utilizing existing infrastructure for call setup and call transmission, the utilizing performed without notification;
    generating an output file including the communication data correlated with a communication type, wherein the communication type is at least one of voice over IP, video, instant message, and file sharing;
    monitoring network traffic flow to detect a super node on the network;
    computing network metrics for the super node that measure utilization of the communication application;
    comparing the network metrics for the super node with a policy threshold,
    determining a network violation event based on the comparing; and
    in response to the determination of the network violation event, performing an action to alleviate the violation event, wherein the action includes at least one of increasing the network traffic flow, and decreasing the network traffic flow.

2. The method of claim 1 wherein the output file further including communication data correlated with the communication type for multiple communication resources, wherein the communication resources include at least one of an originating domain, a destination domain, a port number, and the super node.

3. The method of claim 1 wherein the network metrics include at least one of a total number of packets, a total number of packets relating to the communication application, a total number of incoming flows, a number of outgoing flows, a total number of login attempts, a total number of successful logins, a total number of flows over a port dedicated to a protocol, a total session time, a total processor utilization, and a total memory utilization.

4. The method of claim 1 further comprising configuring network policies to include a network condition that includes the communication threshold, the violation event, and the action.

5. The method of claim 1 wherein the utilization is measured in relation to bandwidth, CPU and memory, a number of current users, and a number of supernodes on a network.

6. The method of claim 1 wherein the network metrics are computed for at least one of a port number, an originating internet protocol (IP) address, a destination IP address, a protocol type, a codec instance, a codec type, a flow instance, an in-network to out-of-network instance, and an in-network to an in-network instance.

7. A network traffic detection system for a network, the system comprising:
    a non-transitory computer readable medium comprising:
    at least one detector module that detects network communications generated by a communication application, wherein the network communications are at least one of voice over IP communications, video communications, instant message communications, and file sharing communications, the communication application configured for utilizing existing infrastructure for call setup and call transmission, the utilizing performed without notification;
    a super node discoverer module for monitoring network traffic flow to detect a super node on the network;
    an adapter module that computes network metrics for the super node that measure utilization of the communication application;
    a data evaluator module that compares the network metrics for the super node with predefined network policies to determine a violation event; and
    a policy manager module that performs one or more predefined actions to alleviate the violation event.

8. The system of claim 7 wherein the at least one detector module generates an output file including communication data relating to multiple communication devices.

9. The system of claim 8 wherein the adapter module processes the communication data of the output file and computes the network metrics based on the communication data relating to the multiple communication devices.

10. The system of claim 7 wherein the network metrics include at least one of a total number of packets, a total number of packets relating to the communication application, a total number of incoming flows, a number of outgoing flows, a total number of login attempts, a total number of successful logins, a total number of flows over a port dedicated to a protocol, a total session time, a total processor utilization, and a total memory utilization.

11. The system of claim 7 wherein the network policies are defined by a network condition, the violation event, and an action, wherein the network condition includes a communication threshold, and wherein the data evaluator module compares the network metrics with the communication thresholds to determine the violation event and the action.

12. The system of claim 7 further comprising at least one user interface that at least one of displays the network metrics, displays the network metrics as compared with the policies, displays the violation event, and provides policy configuration parameters.

13. The system of claim 7 wherein the detector module includes a plurality of detection mechanisms that detect communication types, and a correlator sub-module that correlates communication network data with the communication type.

14. The system of claim 7 wherein the network metrics are computed for at least one of a port number, an originating internet protocol (IP) address, a destination IP address, a protocol type, a codec instance, a codec type, a flow instance, an in-network to out-of-network instance, and an in-network to an in-network instance.

15. A non-transitory computer storage medium having computer-executable instructions for performing a method, the method comprising:
    monitoring network devices for communication data, the network devices running a communication application, the communication application configured for utilizing existing infrastructure for call setup and call transmission, the utilizing performed without notification;

generating an output file including the communication data correlated with a communication type, wherein the communication type is at least one of voice over IP, video, instant message, and file sharing;

monitoring network traffic flow to detect a super node on the network;

computing network metrics for the super node;

comparing the network metrics for the super node with a policy threshold;

determining a network violation event based on the comparing; and performing an action to alleviate the violation event, wherein the action includes at least one of increasing the network traffic flow, and decreasing the network traffic flow.

16. The computer-readable medium of claim 15 wherein the output file of the method further includes communication data correlated with a communication type for multiple communication resources, wherein the communication resources include at least one of an originating domain, a destination domain, a port number, and the super node.

17. The computer-readable medium of claim 15 wherein the network metrics of the method include at least one of a total number of packets, a total number of packets relating to the communication application, a total number of incoming flows, a number of outgoing flows, a total number of login attempts, a total number of successful logins, a total number of flows over a port dedicated to a protocol, a total session time, a total processor utilization, and a total memory utilization.

18. The computer-readable medium of claim 15 wherein the network metrics are computed for at least one of a port number, an originating internet protocol (IP) address, a destination IP address, a protocol type, a codec instance, a codec type, a flow instance, an in-network network to out-of-network instance, and an in-network to an in-network instance.

* * * * *